(12) United States Patent
Wang et al.

(10) Patent No.: US 7,157,031 B2
(45) Date of Patent: Jan. 2, 2007

(54) METHOD OF REPLICATING A TEXTURED SURFACE

(75) Inventors: Hong Ying Wang, Fremont, CA (US); Gary C. Rauch, Pleasanton, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 344 days.

(21) Appl. No.: 10/445,323

(22) Filed: May 27, 2003

(65) Prior Publication Data

US 2004/0038081 A1    Feb. 26, 2004

Related U.S. Application Data

(60) Provisional application No. 60/406,136, filed on Aug. 26, 2002, now abandoned.

(51) Int. Cl.
*B29C 43/18* (2006.01)
(52) U.S. Cl. .................. 264/133; 264/1.33; 264/293; 264/294
(58) Field of Classification Search ............ 264/1.33, 264/259, 293, 294
See application file for complete search history.

(56) References Cited

U.S. PATENT DOCUMENTS

| | | | |
|---|---|---|---|
| 4,698,251 A | 10/1987 | Fukuda et al. | |
| 4,747,093 A * | 5/1988 | Benne et al. | 369/280 |
| 5,268,207 A | 12/1993 | Kruger et al. | |
| 5,582,878 A | 12/1996 | Ogawa et al. | |
| 5,895,582 A | 4/1999 | Wilson et al. | |
| 5,928,750 A | 7/1999 | Gao et al. | |
| 6,027,595 A * | 2/2000 | Suleski | 156/230 |
| 6,129,612 A | 10/2000 | Reynen et al. | |
| 6,132,843 A | 10/2000 | Kuroda et al. | |
| 6,497,925 B1 | 12/2002 | Chen et al. | |
| 6,723,198 B1 * | 4/2004 | Kurataka et al. | 156/232 |

FOREIGN PATENT DOCUMENTS

| | | | |
|---|---|---|---|
| EP | 1 174 258 A1 | | 1/2002 |
| JP | 04355229 A | * | 12/1992 |
| WO | WO 00/10929 | | 3/2000 |

* cited by examiner

*Primary Examiner*—Edmund H. Lee
(74) *Attorney, Agent, or Firm*—McDermott Will & Emery LLP

(57) ABSTRACT

The present invention relates to methods for forming textured surfaces in a polymeric surfaces. Moreover, the present invention relates to methods for forming textured surfaces in a polymeric surfaces and faithfully replicating the textured surfaces in the surfaces of sol-gel films on the surfaces of very hard materials, e.g., of glass, ceramic, or glass-ceramic substrates.

11 Claims, 3 Drawing Sheets

Form Sol-Gel Layer

Form Sol-Gel Layer

METHOD OF REPLICATING A TEXTURED SURFACE

CROSS-REFERENCE TO PROVISIONAL APPLICATION

This application claims priority from U.S. provisional patent application Ser. No. 60/406,136 filed Aug. 26, 2002, now abandoned, the entire disclosure of which is incorporated herein by reference.

RELATED APPLICATIONS

This application contains subject matter related to the subject matter disclosed in the following commonly assigned copending U.S. patent applications:

U.S. patent application Ser. No. 10/079,516, filed on Feb. 22, 2002, entitled "Servo Pattern Formation Via Transfer Of Sol-Gel Layer and Magnetic Media Obtained Thereby"

U.S. patent application Ser. No. 09/852,084, filed on May 10, 2001, entitled "Defect-Free Patterning of Sol-Gel-Coated Substrates for Magnetic Recording Media"; and U.S. patent application Ser. No. 09/852,268, filed on May 10, 2001, entitled "Mechanical Texturing of Sol-Gel-Coated Substrate for Magnetic Recording Media".

FIELD OF THE INVENTION

The present invention relates to methods for forming textured surfaces in a polymeric surface and replicating to very hard-surfaced, high modulus substrates such as of glass, ceramic, and glass-ceramic materials. The invention has particular utility in the manufacture of magnetic data/information storage and retrieval media, e.g., hard disks.

BACKGROUND OF THE INVENTION

A method of creating a textured surface on a hard-surfaced high modulus alternative substrate, such as glass, ceramic, and glass-ceramic materials, includes direct mechanical texturing of the surface of the substrate. Mechanical texturing on a glass substrate to obtain anisotropic thin-film media has been pursued intensively for some time because of the high performance of the media and the high modulus of the glass substrate. However, the extreme hardness of the glass substrate imposed a great difficulty in achieving the desired surface topography for high orientation ratio, and in process control to maintain the desired topography. Imperfect mechanically textured surfaces have been formed with deep cuts and non-uniformity due to the difficult process conditions.

A recently developed approach for texturing surfaces of hard-surfaced, high modulus alternative substrate materials, such as glass, ceramic, and glass-ceramic materials, is to mechanically texture directly on a sol-gel layer spin-coated on a glass substrate. With its glass-like properties, sol-gel has very strong affinity to a glass substrate and bonds to the substrate very well. By treating the sol-gel layer at different temperatures, different surface hardnesses can be obtained to achieve the desired surface topography and better process control. However, obtaining precise replication by mechanical texturing of the sol-gel layer on the glass substrate is difficult to achieve from disk to disk.

In view of the above, there exists a need for improved methodology and means for forming a high quality texture pattern in polymeric surfaces and replicating it to the surface of high modulus, very hard materials such as glass, ceramic, or glass-ceramic disk substrates, such that the "perfect" textured polymeric surface can be reproduced and repeated from disk to disk and all the disks can have the identical high surface quality.

The present invention addresses and solves problems and difficulties attendant upon the formation of faithfully replicated textured surface patterns in the surfaces of sol-gel films on the surfaces of very hard materials, e.g., of glass, ceramic, or glass-ceramic substrates, such as are utilized in the manufacture of magnetic recording media, while maintaining full capability with substantially all aspects of conventional automated manufacturing technology. Further, the methodology and means afforded by the present invention enjoy diverse utility in the manufacture of various other devices requiring formation of surfaces with precisely replicated surface texturing formed therein.

DISCLOSURE OF THE INVENTION

An advantage of the present invention is an improved method of replicating a textured surface in a hard surface, high modulus substrate.

Additional advantages and other aspects and features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other aspects and advantages are obtained in part by a method of replicating a textured surface, comprising the steps of:

(a) mechanically texturing a surface of a stamper to form a textured surface to be replicated;

(b) forming a layer of a material in contact with at least one of the textured surface of the stamper or with a surface of a substrate;

(c) urging the substrate and the stamper together with the layer of material therebetween; and (d) separating the stamper and the substrate such that the layer of material is on the substrate and has a replica of the textured surface of the stamper in the layer of material.

According to embodiments of the present invention step (a) comprises mechanically texturing the surface of the stamper by way of polishing.

According to embodiments of the present invention step (b) comprises forming a layer of a partially dried sol-gel material in contact with the textured surface of the stamper and step (b) comprises spin coating a layer of partially dried sol-gel material comprised of a Micro-porous structure of silica ($SiO_2$) particles with solvents saturated in the micro-pores thereof.

Further, according to embodiments of the present invention, at least the textured surface of the stamper is comprised of a polymer or a metal or alloy coated with a layer of a polymer.

In accordance with certain embodiments of the present invention, step (b) comprises forming a layer of a partially dried sol-gel material in contact with the surface of the substrate and step (b) comprises spin coating a layer of partially dried sol-gel material comprised of a micro-porous structure of silica ($SiO_2$) particles with solvents saturated in the micro-pores thereof. The substrate is comprised of a glass, ceramic, or glass-ceramic material.

According to further embodiments of the present invention step (c) comprises urging the substrate and the stamper together by application of pressure.

Certain embodiments of the present invention comprise the further step of: (e) converting the layer of partially dried sol-gel material to a glass or glass-like layer and step (e) comprises sintering the layer of partially dried sol-gel material at an elevated temperature.

According to other embodiments of the present invention, improved products are produced by the above described method.

According to an aspect of the present invention, the foregoing and other aspects and advantages are obtained in part by a method of forming a stamper suitable for sol-gel replication, comprising the steps of:

(a) providing a stamper wherein at least the surface of the stamper is comprised of a polymer or a metal or alloy coated with a layer of a polymer; and (b) mechanically texturing a surface of a stamper to form a textured surface or pattern to be replicated to a disk-shaped substrate, wherein the mechanical texturing comprises polishing of the surface of the stamper to form a textured surface or pattern.

According to further embodiments of the present invention step (b) comprises polishing the surface of the stamper with polishing tape or a polishing cloth and free polishing particles, or a slurry of abrasive particles on an absorbent and compliant polishing pad or tape to form a textured surface to be replicated.

According to other embodiments of the present invention, improved products are produced by the above described method.

According to an aspect of the present invention, the foregoing and other aspects and advantages are obtained in part by a stamper comprising:

a stamper support; and means for forming a textured surface onto a substrate urged against the stamper support.

According to further embodiments of the present invention the means for forming includes a textured surface to be replicated on the stamper support and the means for forming also includes a sol-gel-based or derived glass or glass-like layer.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the features are not necessarily drawn to scale but rather are drawn as to best illustrate the pertinent features, wherein.

DESCRIPTION OF THE INVENTION

The present invention addresses and solves problems and difficulties in achieving high fidelity reproduction of surface texture patterns in a partially dried sol-gel layer overlying a high hardness, high modulus material. The above is based upon the discovery that faithful replication of surface texture patterns, formed in the mechanically textured surfaces of stampers, may be obtained in the surfaces of partially dried sol-gel layers by a sol-gel molding+layer transfer process or by a sol-gel imprinting/embossing methodology.

More specifically, the present invention fully exploits the replication capability of the sol-gel process. A high quality mechanically textured surface is formed and used as a mold or stamper to replicate the texturing to the sol-gel layers on glass substrates. A plastic surface, that is inert to the alcohol solvents in the sol-gel solution, can serve as such a mold or stamper. Because of the softer and more conformal nature of the plastic surface, compared to that of a glass surface, a high quality mechanically textured surface can be obtained under optimal process conditions. In this way, difficult mechanical texture process conditions can be avoided while still providing high quality texturing on the glass substrates. An important property of a plastic serving as a mold or stamper for sol-gel is that it can self-release cleanly from sol-gel layer without any sol-gel sticking to its surface after replication. This is because the surface properties of plastic are so different from that of sol-gel that they "dislike" each other. Other high quality materials, such as metals or alloys (i.e. NiP/Al), can serve as the mold or stamper for sol-gel replication when coated with a thin mold release agent such as a polymer.

The mechanical texturing of a surface of a stamper can be achieved by providing scratch marks or lines on the surface of the stamper by mechanical means, such as by polishing. By way of illustration, but not limitation, the polishing means may comprise a polishing tape or free polishing particles and a polishing cloth, as shown in FIGS. 1(A)–1(B).

Figure 1A:
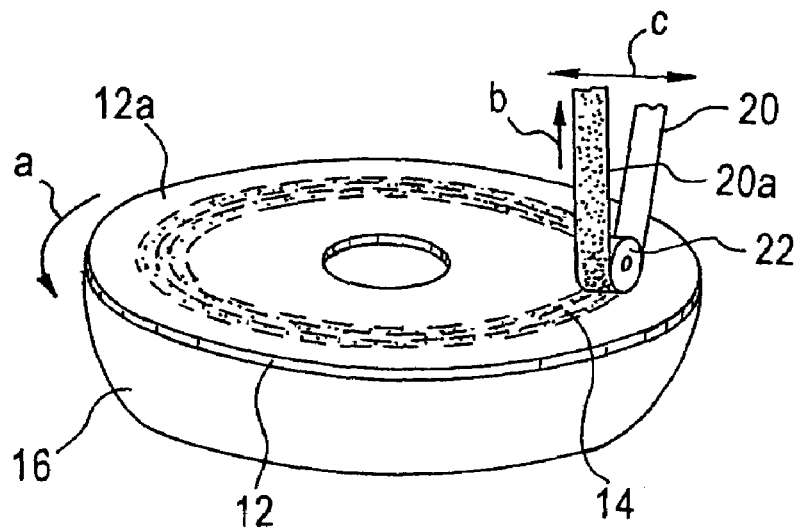
FIGS. 1(A)–1(B) illustrate, a method according to the present invention.

As seen in FIG. 1(A), a polishing tape 20, which is movable as indicated by arrow b, and which is movably driven by a roller 22 is positioned in contact with the upper surface 12a of the stamper 12 (also rotatable as indicated by arrow a) by the weight of the roller 22. It is noted that stamper 12 includes a stamper support 16 which is positioned on the underside of stamper 12. The tape 20 and roller 22 are bodily fed from the peripheral edge toward the center of the stamper 12 or from the center of the stamper 12 to its peripheral edge (as indicated by double-headed arrow c), thereby forming scratch marks 14 on the stamper surface 12a. The depth, pitch and other characteristics of the scratch marks 14 are variable as desired by controlling the weight of the roller 22, the particle size of polishing particles 20a provided on the tape 20, the radial feed speed of the tape 20 and roller 22, etc.

Figure 1B:
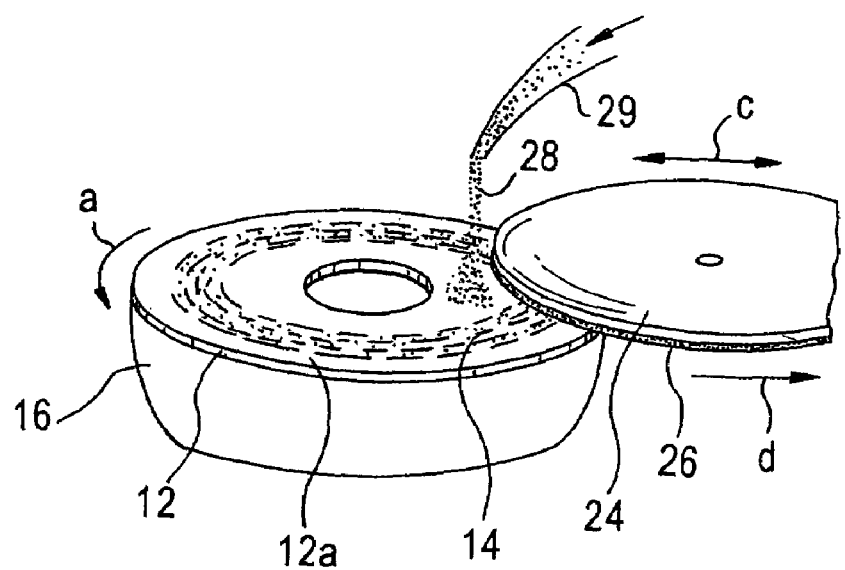

An alternative polishing means includes a rotary disk 24 whose underside is covered with a polishing cross 26 is used, as shown in FIG. 1(B). The disk rotates as indicated by an arrow d, and makes contact, due to gravity, with free polishing particles 28 which are supplied from above through a pipe 29 onto the upper surface 12a of the stamper 12, which also rotates as indicated by arrow a. It is noted that the stamper 12 includes a stamper support 16 which is positioned on the underside of the stamper 12. The disk 24 is fed radially on the stamper 12 from the peripheral edge toward the center of the latter or from the center of the stamper to its peripheral edge (as indicated by double-headed arrow c), so that scratch marks 14 are formed on the stamper surface 12a. Again, the depth, pitch and other factors of the scratch marks 14 are variable as desired by changing the total weight of the disk 24 and polishing cloth 26, the particle size of the polishing particles 28, the radial feed speed of the disk 24, the amount of supply of the particles 28, etc.

The scratch lines or marks formed on the stamper in accordance with the present invention include the following dimensions: mean surface roughness (Ra) from about 0.1 nm to about 10 nm; maximum peak height (Rp) from about 0.5 nm to about 30 mm; maximum valley depth (Rv) from about 0.5 nm to about 30 mm; and line density (1/micron) from about 0.1 to about 100.

With a stamper thus textured in accordance with embodiments of the present invention, accurate replications of the textured surface of the stamper can be made in manners described below.

In a first replication method, the partially dried $SiO_2$—containing sol-gel layer is initially formed on the mechanically textured surface of the stamper, as by spin coating of a solution containing $SiO_2$ gel particles, such that the pattern features of the mechanically textured surface are substantially completely filled by a process similar to molding.

In a second replication method, the surface of a partially dried $SiO_2$—containing sol-gel layer formed on the surface of a high hardness, high modulus substrate (e.g., by spin coating of a solution containing $SiO_2$ gel particles).

According to the next step of the inventive methodology, the substrate and the stamper are urged (i.e. pressed) together with the layer of partially dried sol-gel layer therebetween.

In a following step according to the inventive methodology, the stamper and the substrate are separated and the sol-gel layer adheres to the substrate surface. The sol-gel layer has a replica of the textured surface of the stamper.

The sol-gel film adherence to the substrate is due to the sol-gel's strong affinity to the substrate and its "dislike" to the polymer surface. Further, the depth of the textured pattern formed in the sol-gel is sufficient to compensate for the partial loss of texture depth (i.e. shrinkage) during the later occurring sintering process.

Both replication methods can be used to replicate the high quality mechanically textured surface of the stamper to the sol-gel on glass substrate. The inventive methodologies, therefore, provide a major advance in obtaining useful surface texture patterns in sol-gel layers.

Figure 2A:
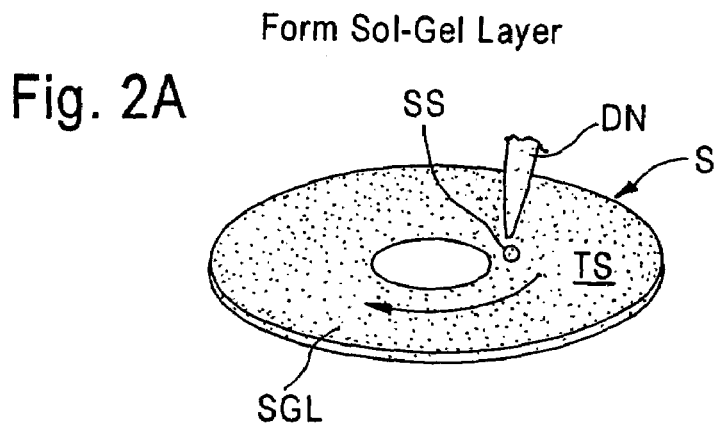
FIGS. 2(A)–2(C) illustrate, in schematic, simplified perspective view, a sequence of steps for performing an embodiment of a method according to the present invention.
Figure 2B:
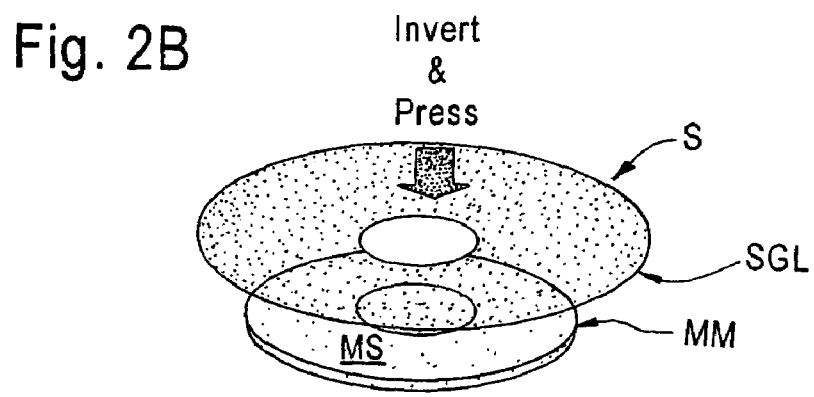
Figure 2C:
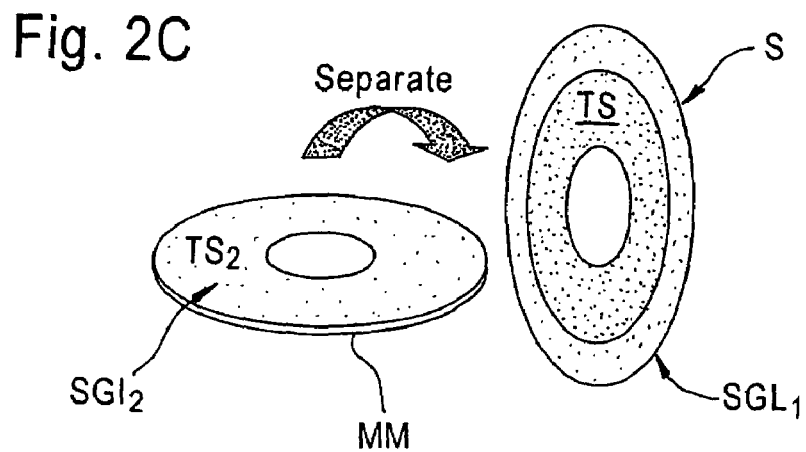

Referring now to FIGS. 2(A)–2(C), shown therein in schematic, simplified perspective view, is a sequence of steps for performing one embodiment of a method for forming a pattern in a sol-gel layer. As illustrated in FIG. 2(A), in a first step according to the embodiment, a stamper S is provided having, e.g., an annular disk-shaped textured surface TS. Textured surface TS includes a desired pattern or texture to be replicated in the surface of a partially dried sol-gel layer. At least the texturing surface TS is comprised of a suitable polymer (e.g., polyetherimide, polycarbonate, etc.). Further, other high quality mechanically textured surfaces, such as NiP/Al surface, can serve as the mold or stamper for sol-gel replication when coated with a thin layer of a plastic or other polymers as the mold release agent. Suitable polymers or plastics include those that are inert to the alcohol solvents in the sol-gel solution and that can self-release cleanly from the sol-gel layer without any sol-gel adhering to their surface after replication. Because of the softer and more conformal nature of the polymer or plastic surface, in comparison to that of a glass surface, a high quality mechanically textured surface can be obtained under optical process conditions. In this way, difficult mechanical texture process conditions can be avoided while still providing high quality texturing on the glass substrate.

Still referring to FIG. 2(A), by way of illustration, but not limitation, a sol-gel layer SGL having a thickness of from about 0.001 to about 10 μm, e.g., about 0.2 μm, is then formed on the texturing surface TS by spin coating of a $SiO_2$ sol solution SS supplied drop-wise via a dispensing nozzle DN. A suitable $SiO_2$ solution for use according to the invention may be prepared by mixing an alkoxide, e.g., a silicon alkoxide such as tetraethoxysilane ("TEOS") or tetramethoxysilane ("TMOS"), water, and nitric acid at molar ratios of TEOS or TMOS/$H_2O$/$HNO_3$ of ¼–30/>0.05. The nitric acid acts as a catalyst for conversion of the TEOS or TMOS to a $SiO_2$ sol according to the following reaction (1), illustratively shown for TEOS:

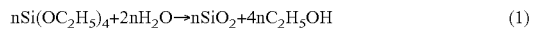

$$nSi(OC_2H_5)_4 + 2nH_2O \rightarrow nSiO_2 + 4nC_2H_5OH \quad (1)$$

with ethanol ($C_2H_5OH$) being produced as a reaction product in solution. After completion of reaction, butanol ($C_4H_9OH$) is added to the solution as a drying retardation agent at molar ratios of TEOS/$H_2O$/$HNO_3$/$C_4H_9OH$ of e.g., 1/5/0.05/>4. Such solution SS, when applied to the texturing surface TS by spin coating, forms a very smooth film with a minimum amount of surface microwaves. A portion of the solvent(s) contained in the layer or film of sol solution is removed during the spin coating process. The resultant partially dried sol-gel film or layer SGL is glass-like and is principally comprised of silica ($SiO_2$) molecular clusters together with the remaining amounts of the various solvents ($H_2O$, $C_2H_5OH$, $C_4H_9OH$). The sol-gel film or layer SGL is of a porous structure with the solvents saturated in the micropores thereof.

Referring now to FIG. 2(B), in a next step according to the illustrated embodiment of the invention, a surface MS of a substrate MM having a smaller diameter than that of stamper S, e.g., an annular disk-shaped substrate is provided in facing relation to the annular disk-shaped texturing surface TS of stamper S coated with the partially dried sol-gel layer SGL and urged into conformal contact therewith, as by applying pressure to either or both of substrate MM or stamper S. The amount of pressure applied to stamper S and/or substrate MM is not critical for practice of the invention, and suitable pressures may range from about 5,000 to about 60,000 lbs/in$^2$. The stamper size is not critical and does not need to be larger than the substrate surface, as discussed above. Although not illustrated herein, the stamper can be the same size as the substrate.

Substrate MM comprises high hardness, high modulus materials, with high modulus glass, ceramic, or glass-ceramic materials being preferred according to the invention, wherein textured surfaces or patterns are to be created in a sol-gel layer formed on a surface thereof. In addition, if desired, surface MS of substrate MM may be provided with an about 0.001 to about 10 μm thick, preferably about 0.2 μm thick, spin-coated, partially dried $SiO_2$ sol-gel layer SGL prior to placement in contact with sol-gel layer SGL formed on the texturing surface TS of stamper S.

Adverting to FIG. 2(C), in a next step according to the invention, stamper S with its texturing surface TS is separated from contact with media substrate MM, such that the (inner) portion of sol-gel layer SGL in contact with the substrate surface MS separates from the texturing surface TS of stamper S and remains in adherent contact with the former, leaving an outer, annular-shaped band $SGL_1$ of sol-gel layer SGL in contact with the peripheral portion of the texturing surface TS of stamper S, and an inner, annular-shaped band $SGL_2$ of sol-gel layer SGL transferred to surface MS of media substrate MM, wherein the textured surface thereof (originally in contact with the texturing surface TS of stamper S) forms the exposed, outer surface of the inner, annular-shaped band $SGL_2$ of sol-gel layer SGL. Thus, the surface of annular-shaped band $SGL_2$ contains a replicated textured surface $TS_2$. As noted above, the size of the stamper is not critical and the stamper can have the same size as the substrate surface and therefore, no annular-shaped band $SGL_1$ would be present on the stamper S.

Subsequent to the above-described transfer of the inner, annular band-shaped portion $SGL_2$ of the partially dried sol-gel film or layer SGL, a sintering process is performed at an elevated temperature from about 300 to above about 1000° C. (depending upon the withstand temperature of the substrate material, i.e., which temperature is higher for ceramic-based substrates than for glass-based substrates) at e.g., a ramping rate from about 0.5 to about 10° C./min. and a dwell time of about 2 hrs., to evaporate the solvents so as to effect at least partial collapse of the micro-pores, with resultant densification of the sol-gel film or layer portion $SGL_2$ into a substantially fully densified glass layer having a density and hardness approaching that of typical silica glass ($<1.5$ g/cm$^3$), or into a partially densified "glass-like" layer. The textured pattern formed in the exposed upper surface of the partially dried sol-gel layer portion $SGL_2$ is preserved in the corresponding exposed upper surface of the sintered glass or glass-like layer.

Figure 3A:
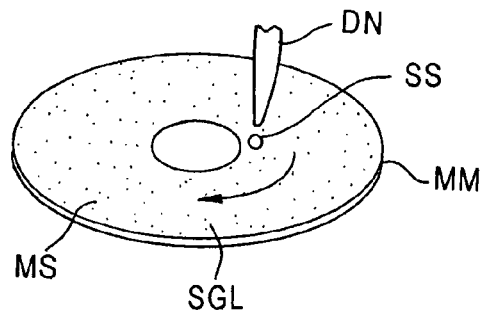
FIGS. 3(A)–3(C) illustrate, in schematic, simplified perspective view, a sequence of steps for performing a second embodiment of a method according to the present invention.
Figure 3B:
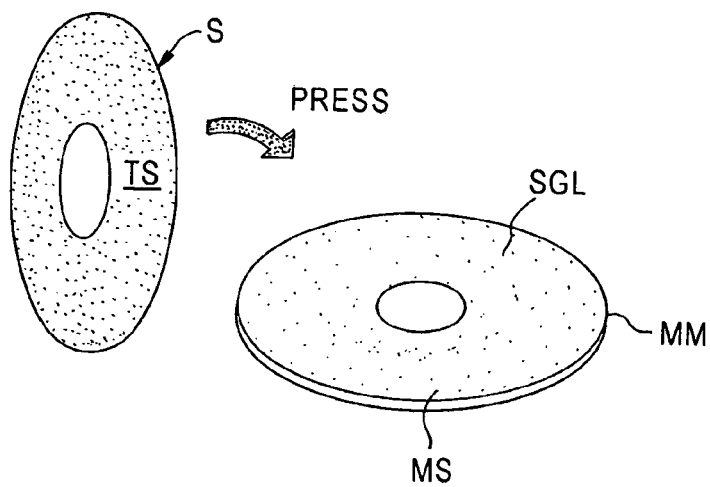
Figure 3C:
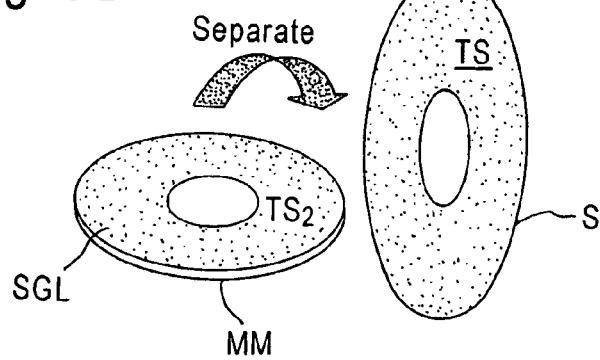

Referring now to FIGS. 3(A)–3(C), shown therein in schematic, simplified perspective view, is a sequence of steps for performing another embodiment of a method for forming a textured surface or pattern in a sol-gel layer.

Referring to FIG. 3(A) by way of illustration, but not limitation, a sol-gel layer SGL having a thickness of from about 0.001 to about 10 μm, e.g., about 0.2 μm, is then formed on the substrate surface MS of the media substrate MM by spin coating of a $SiO_2$ sol solution SS supplied drop-wise via a dispensing nozzle DN.

Referring now to FIG. 3(B), in a next step according to the illustrated embodiment of the invention, the surface MS, coated with the partially dried sol-gel layer SGL, of a substrate MM having a smaller diameter than that of stamper S, e.g., an annular disk-shaped substrate is provided in facing relation to the annular disk-shaped texturing surface TS of stamper S and urged into conformal contact therewith, as by applying pressure to either or both of substrate MM or stamper S. Texturing surface TS includes a textured surface or pattern desired to be formed in the surface of a partially dried sol-gel layer. The amount of pressure applied to stamper S and/or substrate MM is not critical for practice of the invention, and suitable pressures may range from about 5,000 to about 60,000 lbs/in$^2$. Again, the size of the stamper is not critical and the stamper can have the same size as the substrate surface.

Adverting to FIG. 3(C), in a next step according to the invention, stamper S with its texturing surface TS is separated from contact with media substrate MM, such that the textured sol-gel layer SGL remains in adherent contact with the substrate surface MS of the media substrate MM. The textured sol-gel layer SGL comprising a replicated textured surface $TS_2$. The sol-gel film or layer SGL with its replicated textured surface $TS_2$, is then subjected to a sintering process, similar to the sintering process detailed above, to preserve the replicated textured surface $TS_2$.

Thus, the present invention advantageously provides improved processing techniques and methodologies, which can be practiced at low cost to yield improved, textured surface substrates comprised of high hardness, high modulus materials.

In the previous description, numerous specific details are set forth, such as specific materials, structures, reactants, processes, etc., in order to provide a better understanding of the present invention. However, the present invention can be practiced without resorting to the details specifically set forth. In other instances well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A method of replicating a textured surface, comprising the steps of:
   (a) mechanically texturing a surface of a stamper by way of polishing, to form a textured surface to be replicated;
   (b) forming a layer of a material in contact with at least one of the textured surface of the stamper or with a surface of a substrate;
   (c) urging the substrate and the stamper together with the layer of material therebetween; and
   (d) separating the stamper and the substrate such that the layer of material is on the substrate and has a replica of the textured surface of the stamper in the layer of material.

2. A method of replicating a textured surface, comprising the steps of:
   (a) mechanically texturing a surface of a stamper by way of polishing, to form a textured surface to be replicated;
   (b) forming a layer of a partially dried sol-gel material in contact with the textured surface of the stamper;
   (c) urging the substrate and the stamper together with the layer of material therebetween; and
   (d) separating the stamper and the substrate such that the layer of material is on the substrate and has a replica of the textured surface of the stamper in the layer of material.

3. The method according to claim 2, wherein step (b) comprises spin coating a layer of partially dried sol-gel material comprised of a micro-porous structure of silica ($SiO_2$) particles with solvents saturated in the micro-pores thereof.

4. The method according to claim 2, wherein at least the textured surface of the stamper is comprised of a polymer.

5. The method according to claim 2, wherein at least the stamper is comprised or a metal or alloy coated with a layer of a polymer.

6. The method according to claim 1, wherein step (b) comprises forming a layer of a partially dried sol-gel material in contact with the surface of the substrate.

7. The method according to claim 6, wherein step (b) comprises spin coating a layer of partially dried sol-gel material comprised of a micro-porous structure of silica ($SiO_2$) particles with solvents saturated in the micro-pores thereof.

8. The method according to claim 6, wherein the substrate is comprised of a glass, ceramic, or glass-ceramic material.

9. The method according to claim 1, wherein step (c) comprises urging the substrate and the stamper together by application of pressure.

10. The method according to claim 2, further comprising the step of:

(e) converting the layer of partially dried sol-gel material to a glass or glass-like layer.

11. The method according to claim 10, wherein step (e) comprises sintering the layer of partially dried sol-gel material at an elevated temperature.

* * * * *